US007248598B2

(12) United States Patent
Couty (10) Patent No.: US 7,248,598 B2
(45) Date of Patent: Jul. 24, 2007

(54) METHOD OF AND A SYSTEM FOR LIGHTENING THE SIGNALING LOAD OF A MULTICAST PROTOCOL APPLIED TO A NETWORK OF TERMINALS USING A TRANSMISSION MEDIUM THAT DOES NOT SUPPORT MUTUAL LISTENING BETWEEN TERMINALS

(75) Inventor: Richard Couty, Ermont (FR)

(73) Assignee: Alcatel, Paris (FR)

( * ) Notice: Subject to any disclaimer, the term of this patent is extended or adjusted under 35 U.S.C. 154(b) by 1090 days.

(21) Appl. No.: 10/171,623

(22) Filed: Jun. 17, 2002

(65) Prior Publication Data

US 2002/0191631 A1 Dec. 19, 2002

(30) Foreign Application Priority Data

Jun. 18, 2001 (FR) .................................. 01 07956

(51) Int. Cl.
  H04L 12/28 (2006.01)
  H04L 12/56 (2006.01)
(52) U.S. Cl. .................................................... 370/423
(58) Field of Classification Search ........ 370/389–401, 370/349–352, 432, 346, 201, 449; 709/238, 709/236, 203, 250
See application file for complete search history.

(56) References Cited

U.S. PATENT DOCUMENTS

| 6,331,983 B1* | 12/2001 | Haggerty et al. ............ 370/400 |
| 6,781,999 B2* | 8/2004 | Eyuboglu et al. ............ 370/399 |
| 2002/0085506 A1* | 7/2002 | Hundscheidt et al. ....... 370/254 |
| 2002/0150094 A1* | 10/2002 | Cheng et al. ............... 370/389 |
| 2003/0135644 A1* | 7/2003 | Barrett ........................ 709/238 |

FOREIGN PATENT DOCUMENTS

| EP | 0951198 A2 | 10/1999 |
| WO | WO 9916201 | 4/1999 |

OTHER PUBLICATIONS

V. Johnson et al, "IP Multicast: Making it Happen", Data Communications, McGrawy Hill, NY, US, vol. 26, No. 7, May 21, 1997, pp. 76-79, 81 XP000695159.
G. Xylomenos et al, IP Multicasting for wireless mobile hosts, Military Communications Conference, 1996. Milcom '96, Conference Proceedings, IEEE McLean, VA Oct. 21-24, 1996, NY, NY IEEE Oct. 21, 1996, pp. 933-937 XP010204037.

* cited by examiner

Primary Examiner—Chi Pham
Assistant Examiner—Prenell Jones
(74) Attorney, Agent, or Firm—Sughrue Mion, PLLC (57) ABSTRACT

The invention concerns the transmission of data packets in multicast mode, in which method the packets are sent from a sending end of a physical transmission medium and received by terminals at a receiving end of said medium. It finds a typical application in networks whose terminals cannot listen to each other, which is the case in satellite networks, for example, whereas management implies sending a query message to the terminals in order to determine the presence of an active group of terminals as a function of the reception of a response message from a terminal of said group. A signal is then sent to the terminals from the sending end, preferably the returned response, to indicate reception of a response message from a terminal of the group of terminals, so that terminals that have not sent a response message can act accordingly, in particular by interrupting their own process for sending a response. The method can be integrated transparently into the IGMP and the RFC 1112 standard that governs multicast transmission of data packets. A system for implementing the management method is also provided, and possibly integrated into a router.

29 Claims, 6 Drawing Sheets

METHOD OF AND A SYSTEM FOR LIGHTENING THE SIGNALING LOAD OF A MULTICAST PROTOCOL APPLIED TO A NETWORK OF TERMINALS USING A TRANSMISSION MEDIUM THAT DOES NOT SUPPORT MUTUAL LISTENING BETWEEN TERMINALS

The invention relates to transmitting data packets over networks in a multicast mode, particularly in the context of networks of terminals whose transmission medium does not enable a terminal to listen to messages sent by another terminal, which is the case in particular with satellite and like terminal networks.

BACKGROUND OF THE INVENTION

Multicasting enables a sending source to broadcast the same data packets over a network to each terminal of a designated group of destination terminals in one sending. In the context of the Internet in particular, multicasting is covered by a specific transmission protocol which was produced for terminals connected by cable broadcast local area networks, such as Ethernet networks, which support listening between terminals. The protocol exploits this listening facility to lighten the traffic of acknowledgment messages sent by the destination terminals, as explained below. The object of the invention is to make this facility available to networks of satellite or like terminals that do not support listening between terminals.

The multicast services on offer are at present in their early days, as optimizing the Internet bandwidth has been considered to be of secondary importance compared to growing the network. The galloping increase in the bandwidth required for Internet services, because of the enthusiasm of the public and the rapid growth of the services on offer, is beginning to show up the inevitable limitations of multicast broadcasting.

Satellite systems have the natural advantage of offering point-to-multipoint services (which explains their success in direct video broadcasting by satellite (DVB-S) services, and they are therefore very well positioned for the new multicast market. The present growth of and interest in this market are comparable to the penetration of the web a few years ago. Multicast client applications are numerous:
  TV broadcasting,
  real-time broadcasting of stock market prices,
  videoconferences,
  on-line business (bids),
  stock distribution,
  etc.

Multicasting is already implemented in Internet cable networks, for which it is standardized by Requests For Comments RFC 1112 and RFC 2236 of the Internet Engineering Task Force (IETF), respectively representing versions 1 and 2 of the Internet Group Management Protocol (IGMP).

Under this protocol, the receiver terminals do not have only a passive role, but must send specific messages and listen, with a very short time-delay, to the transmissions of other terminals connected to the same transmission medium.

Figure 1:
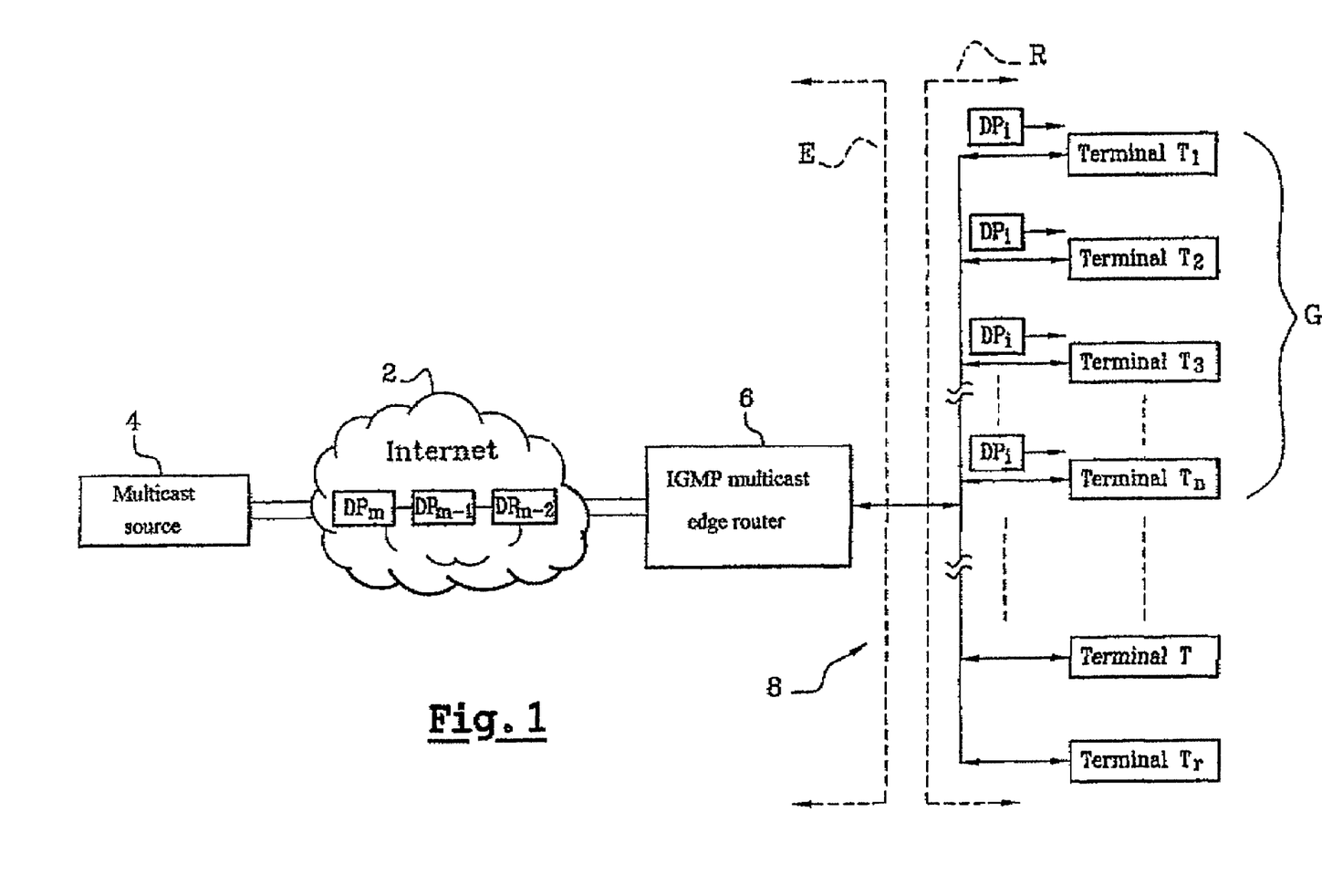
FIG. 1, already described, is a simplified diagram of a prior art system for multicast transmission of data packets on the Internet and a cable local area network, such as an Ethernet network, enabling the communicating terminals to listen to each other, FIG. 2, already described, is a simplified diagram of a system for transmitting data packets via a network of satellite terminals served by a gateway, which constitutes one example of communicating terminals that cannot listen to each other, and for which the invention can be implemented in the context of multicast broadcasting.

FIG. 1 is a diagrammatic representation of the multicast data communication principle of the IETF's IGMP on a cable broadcast network such as an Ethernet network.

Multicast data is sent in the form of successive packets ( . . . , $DP_{m-2}$, $DP_{m-1}$, $DP_m$, . . . ) over the Internet 2 and in accordance with the IGMP from a source 4 to a multicast edge router 6. The router is responsible for forwarding multicast data packets received from the Internet 2 to the cable subnetwork 8 within which it is responsible for broadcasting. The subnetwork 8, which is an Ethernet network, for example, connects a number r of terminals T1-Tr to support:
  quasi-simultaneous reception by each terminal that is a member of a multicast group of the same multicast data packet DPi forwarded by the edge router 6,
  sending of messages from any terminal to the edge router 6,
  listening by any terminal to messages sent to the router by any other terminal, and
  exchange of data between the terminals.

The following description refers to two ends of the multicast transmission medium:
  the multicast data sending end E, which is generally the end at which the router 6 or a medium access gateway is located, and
  the multicast data receiving end R, which is generally the end at which the inputs of the terminals T1-Tn are located.

For a given multicast session, the router 6 identifies the group G of participating terminals to which the data packets must be sent. The group G of participating terminals is identified by an address in each packet DP received by the router 6. The group G may constitute a varied and changing number of terminals, from one terminal to all of the terminals served by the router. In the FIG. 1 example, the group G comprises a number n of terminals T1-Tn shown receiving the same data packet DPi. Note that a plurality of different multicast groups can be served by the same router 6 and that some terminals can participate in more than one group at a time. Similarly, the multicast source 4 can send data packets to a plurality of different edge routers.

The main problem with the multicast edge router 6 is determining whether it must forward the packets received or not. It is therefore preoccupied with finding out if there is at least one participating terminal in the group identified by the address of the multicast packet that it has just received from the Internet 2.

The IGMP, as defined by the IETF in RFC 1112, includes a mechanism for maintaining groups that enables a local multicast router to find out if there is still at least one member terminal of a given multicast group in the subnetwork 8. This enables it to decide whether it should still route the traffic of that group to the network or stop doing so.

This mechanism simply consists in the router 6 periodically sending a membership query defined by the IGMP. This query is picked up by all the terminals T1-Tr connected to the local area network 8. A terminal that wishes to remain or to become a member of a group G must respond to the router 6 with a membership report message to indicate to the router that it is still interested in the traffic of that group.

According to the standard, the router has no need of a comprehensive list of all the member terminals, and only needs to know whether there is at least one member terminal or none at all. Consequently, there would seem to be no point in all the member terminals responding to the query, disturbing the other participants to decode their own response, and creating an overload on the network.

Because a single response is sufficient to provide the router 6 with the necessary information, the standard specifies that, on receiving a query, each terminal must start a random time-delay before responding. During this time-delay, each terminal listens to the line to intercept a response coming from any other terminal. If no response has been picked up on the line when the time-delay of one terminal expires, then only that terminal sends its response, which is picked up by the other terminals, which react by interrupting their time-delay without sending their response. This ensures that only one response is returned for each query sent by the edge router 6, regardless of the composition of the group of terminals, which avoids the overload problem.

Clearly the advantage at which the RFC 1112 standard is aimed cannot be obtained if the subnetwork (such as a network of satellite or like terminals) does not enable a terminal to intercept responses sent to the router 6 by another terminal.

Figure 2:
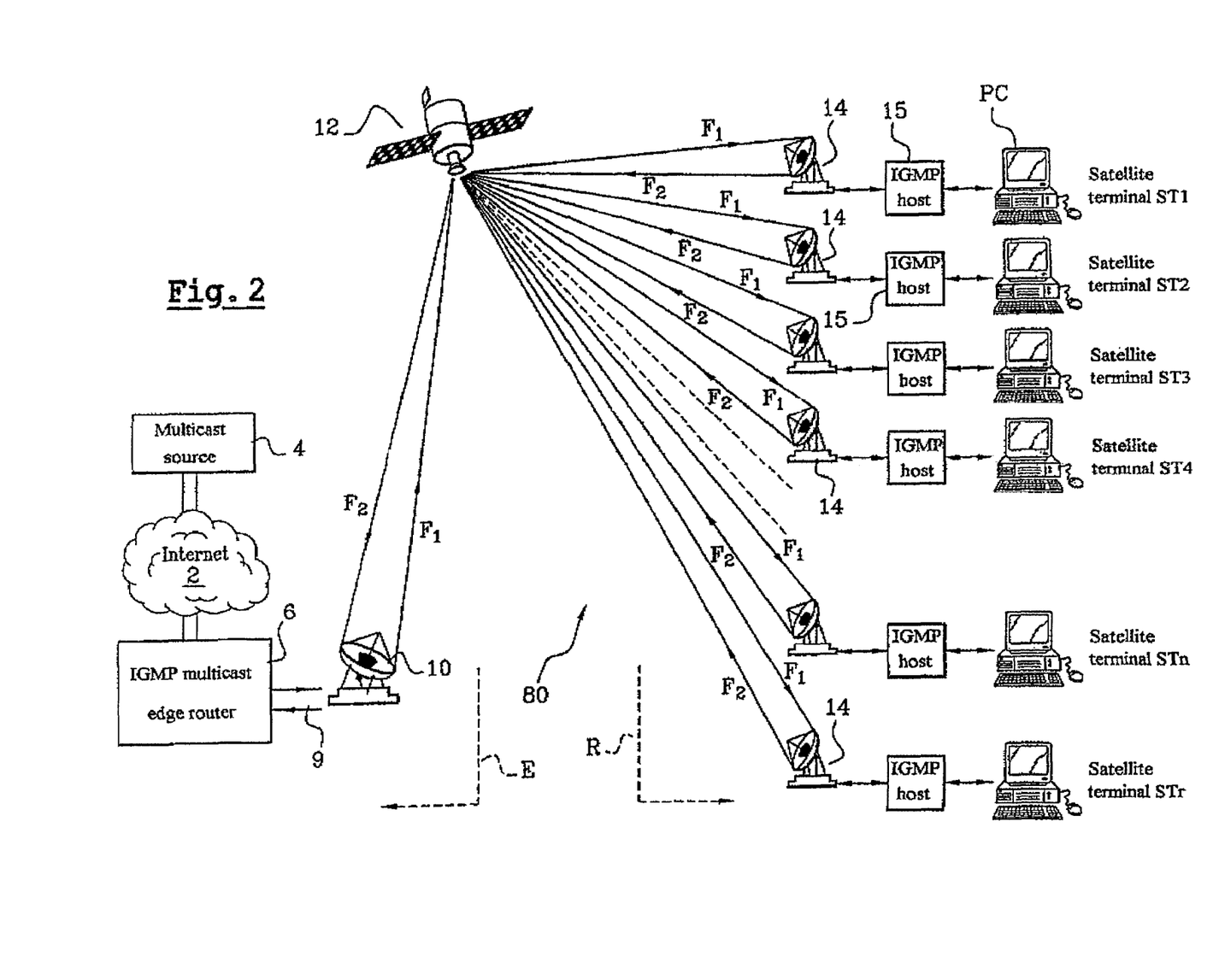

The organization of this kind of subnetwork and its operation in multicast mode are described with reference to FIG. 2 in the context of a network of satellite terminals. The communication system is similar to that of FIG. 1, except that the subnetwork 80 includes satellite communication channels.

The example is based on an A 9780 NG satellite access network architecture. The multicast data source 4 is connected to an edge router 6 conforming to the IGMP protocol via the Internet 2, but it is to be understood that the source can be connected to the router by any other communication channel.

The router 6 communicates with the satellite terminals ST1-STr via a ground station 10, known as a gateway, comprising a transceiver associated with a satellite antenna, the gateway and the router being connected by a bi-directional transmission cable 9 or the like. The gateway 10 sets up a communication link to a geosynchronous telecommunication satellite 12 which serves as a relay station for all the satellite terminals ST1-STr. Each satellite terminal ST includes a parabolic antenna and radio-frequency send-receive circuits 14 connected to a personal computer PC or other communication unit via an IGMP host 15. The router 6 can therefore send multicast data packets to the satellite terminals and receive messages sent by them.

For each local area network 80, characterized by its radio carrier frequency, the satellite 12 provides:

a go link from a gateway 10 to the satellite terminals ST listening to this radio carrier frequency (f1), and a return link on another radio carrier frequency (f2) associated with the go link, for conveying messages from the satellite terminals ST to the gateway 10.

Each satellite terminal can receive (or to be more precise, listen to) all the messages on the go link, including those addressed to other terminals, but only the gateway 10 can receive messages from a terminal. This is because the channels usually employ a receive frequency f1 common to all the terminals that is necessarily different from their transmit frequency f2, which may or may not be common to all the terminals, and so are not able to listen to the transmissions of other terminals. Note that the idea of adding to the satellite terminal means for listening to the second frequency can be realized only by providing relatively costly hardware, including a second receiver system and a duplexer.

Accordingly, only the gateway 10 can receive membership report responses from the satellite terminals ST, whereas all the terminals receive the membership query sent once only by the gateway 10 and carrying either the multicast address of all the terminals or the multicast address of the group for which it sends the membership query message.

What is more, geosynchronous satellite transmission systems induce a minimum time-delay of approximately 270 milliseconds (ms) between sending by the source (edge router 6) and reception by the destination (terminal ST), which makes the IETF solution even less applicable.

For these reasons, the standard mechanism used for cable subnetworks, based on inter-terminal surveillance and using time-delays to interrupt the sending of responses by the terminals, unfortunately will not work on a satellite or like link which connects the terminals to a central IGMP router (or function), whether it is behind a gateway or in a satellite Network Control Center (NCC). Applying the RFC 1112 standard in the conventional way, the return satellite channels are periodically overloaded by this response traffic to the queries sent (the RFC 1112 standard prevents this in networks supporting broadcast transmission).

To give a more concrete example of the orders of magnitude involved, and considering a system in which 5000 multicast groups use the satellite subnetwork 80 and each group is picked up by 2000 member terminals, in each interrogation period (i.e. on average every minute, according to the average value proposed in the RFC 1112 standard), a response traffic volume of 5000×2000 packets is generated. Taking the somewhat favorable situation of a radio packet having a size of 55 bytes, this induces a mean bit rate—and thus a bandwidth—of approximately 75 Mbit/s.

Moreover, this traffic is not uniformly distributed over the whole of the one minute period. According to IGMP version 2, the router 6 can request a response from the terminals ST within a maximum time-delay of 25.6 seconds. If a lower value is chosen, for example 5 seconds, the traffic is concentrated in this shorter period of 5 seconds.

Now, one fundamental characteristic of radio transmission systems is the limited band of frequencies that can be used for each system. The transmission capacity of these systems is fundamentally related to the allocated frequency band. Optimizing transmission capacity by minimizing the number, size or duration of messages is a constant preoccupation of radio transmission system designers.

OBJECT AND SUMMARY OF THE INVENTION

Given the foregoing considerations, an object of the invention is to enable communication systems using a network whose transmission medium is not of the broadcast type, and which therefore does not support listening between terminals, nevertheless to benefit from provisions aimed at reducing the redundancy of response messages from other multicast terminals.

A first aspect of the invention provides a method of managing the communication of data packets in multicast mode, in which method the packets are sent from a sending end of a physical transmission medium and received by terminals at a receiving end of said medium, which does not support mutual listening between the terminals, and a query message is sent to the terminals in order to determine the presence of an active group of terminals as a function of the reception of a response message from a terminal of said group, wherin the method includes the step of sending said terminals from said sending end a signal indicating reception at the sending end of a response message from a terminal of said group of terminals, so that terminals that have not sent a response message can act accordingly, in particular by interrupting their own process for sending a response.

Communication is advantageously managed in accordance with the Internet Group Management Protocol, said query message is an IGMP member query message, and said response message is an IGMP membership report message.

The sending of a response message by a terminal of the group can be governed by the IGMP Request For Comments RFC 1112.

The signal sent from the sending end is advantageously a response message returned to the terminals from a terminal of the group.

The sending step can then consist in systematically returning to the terminals each response message received from the group, or returning to the terminals a number of received response messages less than the total number of response messages received from a terminal of the group, to lighten the data traffic load.

In this latter case, the number of received response messages returned can be a fraction 1/N of the total number of response messages received, where N is a fixed or changing number.

For example, the value N can be changed dynamically as a function of conditions of use of the network in order to maintain substantially constant the number of received response messages returned in the sending step for each query message sent.

The signal is typically sent via a gateway of a radio link that is used to broadcast said multicast data packets using the transmission medium that does not support mutual listening between terminals to receive said data packets sent in multicast mode by the terminals of the transmission medium, for which said gateway is responsible for IGMP multicast transmission mechanisms.

The transmission medium can be a radio satellite link, for example, in which case the terminals are satellite terminals, the multicast data packets and the signal are sent on a go link on a first carrier frequency, and the response message or each response message is sent by the group of satellite terminals on a return link on a second carrier frequency different from the first.

The above sending step can be effected by a management unit located at the gateway or between the gateway and a router that sends said data packets in multicast mode to the terminals.

The management unit can then send the router a response message received from the group of terminals. The method according to the invention can then be used in an existing router.

The sending step can also be effected by means functionally integrated into a router which sends the multicast data packets to the terminals.

A second aspect of the invention provides a system for managing the communication of data packets in multicast mode, in which system packets are sent from a sending end of a physical transmission medium and received by terminals at a receiving end of said medium, which sending end and receiving end are mutually isolated, and a query message is sent to the terminals in order to determine the presence of an active group of terminals as a function of the reception of a response message from a terminal of said group, wherein the system includes return means for sending to said terminals from said sending end a signal indicating reception at the sending end of a response message from a terminal of said group of terminals, so that terminals that have not sent a response message can act accordingly, in particular by interrupting their own process for sending a response.

The optional features of the method of the invention stated above apply mutatis mutandis to the system according to the invention.

A third aspect of the invention provides a router which incorporates a system in accordance with the invention.

BRIEF DESCRIPTION OF THE DRAWINGS

The invention and the advantages that stem from it will become more clearly apparent on reading the following description of preferred embodiments of the invention, which is given by way of non-limiting example only and with reference to the accompanying drawings, in which:

FIG. 5 is a flowchart of a second variant of the concept shown in FIG. 3, FIG. 6 repeats a portion of the FIG. 2 diagram to show a first IGMP response return management unit conforming to the invention, and FIG. 7 repeats a portion of the FIG. 2 diagram to show a second IGMP response return management unit conforming to the invention.

MORE DETAILED DESCRIPTION

Figure 3:
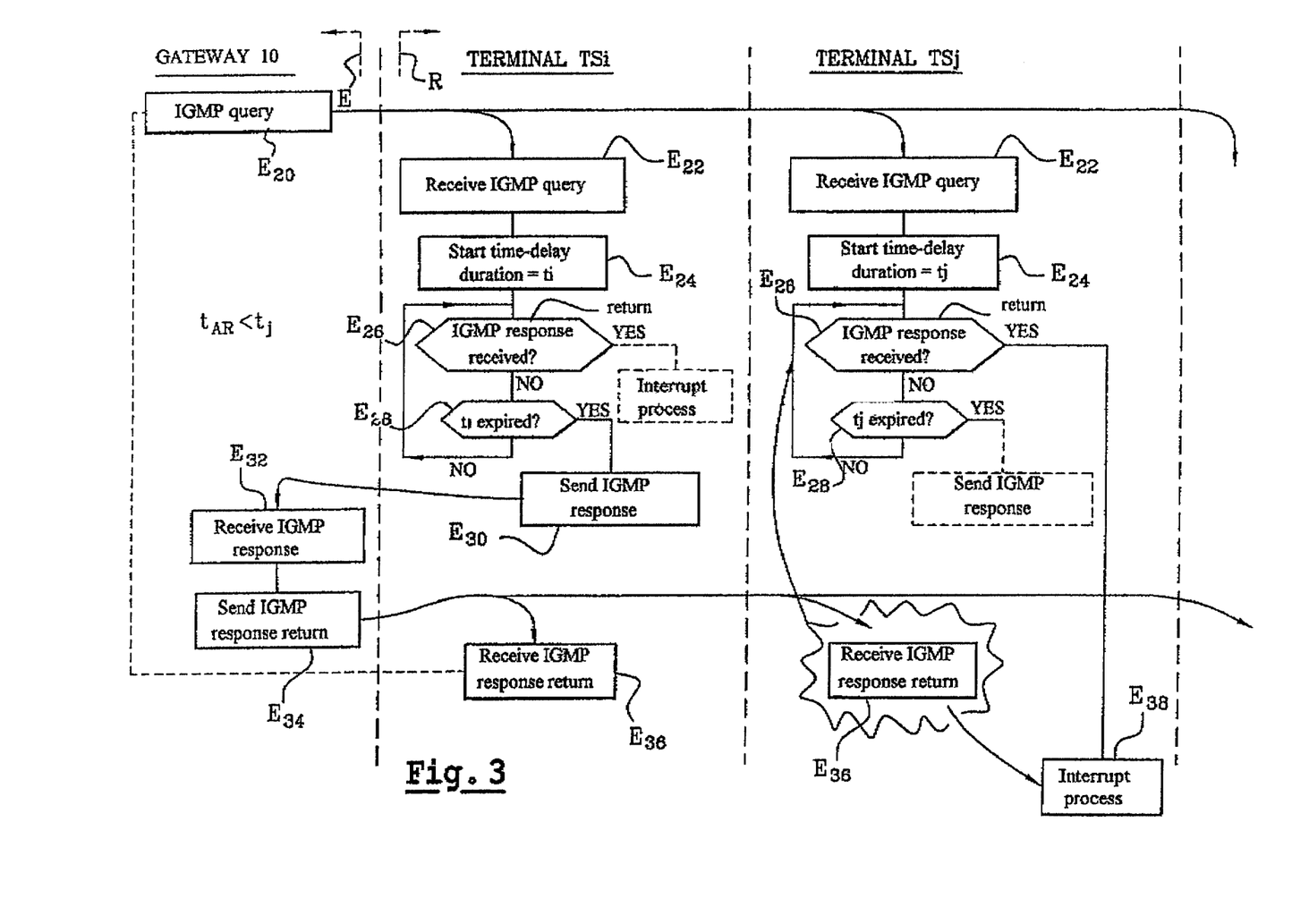
FIG. 3 is a flowchart used to explain the principle of the invention in the context of the FIG. 2 system.

The FIG. 3 flowchart indicates the main process steps executed in the gateway 10 and two satellite terminals TSi and TSj from a group of active terminals, i.e. a group of terminals participating in a multicast session in which data packets are sent from the gateway. The data transmission system is analogous to the FIG. 2 system, and for conciseness is not described again. The terminals TSi and TSj therefore receive multicast data packets routed by the IGMP satellite router 6 and can send messages to them over a satellite link via the gateway 10.

The terminals are typically personal computers PC, each of which is connected via a respective IGMP host 15 to a satellite transceiver including a parabolic antenna 14. The combination of the host 15 and the computer integrates hardware and software for managing the reception of multicast data packets conforming to the IGMP and to the RFC 1112 standard referred to above. To this end, each satellite terminal includes a timer for setting a random time-delay (from zero seconds to a maximum response time as defined by the IGMP satellite router 6 in the membership query message) between receiving a membership query message, hereinafter referred to as an IGMP query, and the conditional sending of a membership report response, hereinafter referred to as an IGMP response.

The process begins (step E20) with sending an IGMP query which conforms to the RFC 1112 standard from the gateway 10 (i.e. from the sending end E) to the group comprising the terminals TSi and TSj. This query is received with a time-delay of approximately 270 milliseconds (ms) by each of the terminals of the group (step E22).

On receiving the query, each terminal sets its timer to establish the random time-delay previously referred to (step E24). In this example, the time-delays for the terminals TSi and TSj are respectively ti and tj, with the time-delay ti being the shortest time-delay for all of the terminals of the group, whence the condition tj>ti.

The terminals then listen out for an IGMP response coming from another terminal (step E26), verifying that their own time-delay has not expired (step E28), based on the process specified in the RFC 1112 standard as applied to a cable network, as described above with reference to FIG. 1. Note that the protocol layers of the satellite terminals for managing IGMP query and response messages are the same as those of a cable network terminal. However, in accordance with the invention, step E26 (listening out for responses) does not listen to other terminals on the same transmission channel (frequency f2)—which is impossible—but listen to the receive channel, namely the go link channel at the carrier frequency f1, as becomes apparent later.

When the time-delay ti expires, the terminal TSi (i.e. the multicast data receiving end R) sends its IGMP response in accordance with the RFC 1112 standard on the return link and on the carrier frequency f2 (step E30), as a result of which only the gateway 10 can detect it.

In accordance with the invention, when the gateway 10 receives the IGMP response (step E32), said response is automatically returned (from the sending end E) to all the terminals of the group on the go link, as it stands and in multicast mode (step E34). This IGMP response return process is managed by a unit at the gateway 10 end of the satellite link, as explained below with reference to FIGS. 6 and 7.

The returned IGMP response initially sent by the terminal TSi is therefore received by all the terminals of the group after a time-delay which is substantially equal to a round trip on the satellite link, i.e. a time-delay of 2×270 ms=540 ms.

Accordingly, assuming that the time-delay tj for the terminal TSj has not expired during the above time-delay, the terminal TSj can react to receiving the returned IGMP response by interrupting its time-delay without sending its own IGMP response (step E38). To be more precise, the terminal TSj destroys its IGMP response message on interruption of the time-delay.

Clearly all the other terminals of the group, whose time-delay has not yet expired when the IGMP response return is received, act like the terminal TSj. Only terminals for which the random time-delay is sufficiently close to ti (i.e. approximately ti+540 ms or less), so that it expires before the response return is received in the step E36 previously cited, continue to send their IGMP response. Of course, each terminal of the group can have the shortest random time-delay ti at any given time. Also, each terminal can perform the IGMP response sending step (E30) and the process interruption step (E38) if necessary (as shown by the boxes in dashed outline).

The invention greatly reduces the number of IGMP responses sent on the return link compared to a conventional approach whereby all the terminals participating in the group systematically send their IGMP response when their time-delay expires. The corresponding improvement in terms of the bandwidth freed up on the return link can be evaluated by the following calculation.

Assume that the random time-delay started in step E24 for all of the terminals of the group is uniformly distributed from zero seconds to a limit value sent to the terminals by the router 6, in the message that includes the IGMP query. The maximum limit value is 25.6 seconds; if this maximum limit value is used, and taking the time of a round trip on the satellite link (approximately 2×0.27 s) for the time-delay between sending the IGMP response by the first terminal that times out (step E30) and reception of the returned response (step E36), the percentage of terminals of the group that have sent their own IGMP response is equal to 100× 2×0.27/25.6, i.e. approximately 2.1%.

Limit values lower than the maximum limit value of 25.6 seconds can of course be used to optimize the efficiency of the method in accordance with the network load and configuration. The efficiency of the method nevertheless decreases as this value decreases.

With regard to the go link (from the gateway 10 to the terminals TS), the sending of IGMP response returns (step E34) implied in the method according to the invention leads to only a very low traffic overload, of the same order of magnitude as the IGMP response traffic on the return link (2%). Even if the IGMP responses on the go and return links are accumulated, the balance nevertheless remains highly favorable, at 2×2% as against 100%.

The method according to the invention has the advantage that it has no impact either on the IGMP stack in the user terminal PC and/or the host 15 or on the protocol stack of the IGMP router 6 at the gateway 10 end. It can therefore be implemented in a totally transparent manner with router and terminal units that conform to the RFC 1112 standard for cable or like networks.

In the FIG. 3 embodiment of the invention, each response received at the gateway 10 (step E32) is systematically returned to the terminals (step E34).

In a variant of the invention, described with reference to the FIG. 4 flowchart, IGMP response returns are filtered at the gateway 10 end so that only one in N responses received in step E32 is returned in step E34, where N is a number that is constant or changes dynamically.

Figure 4:
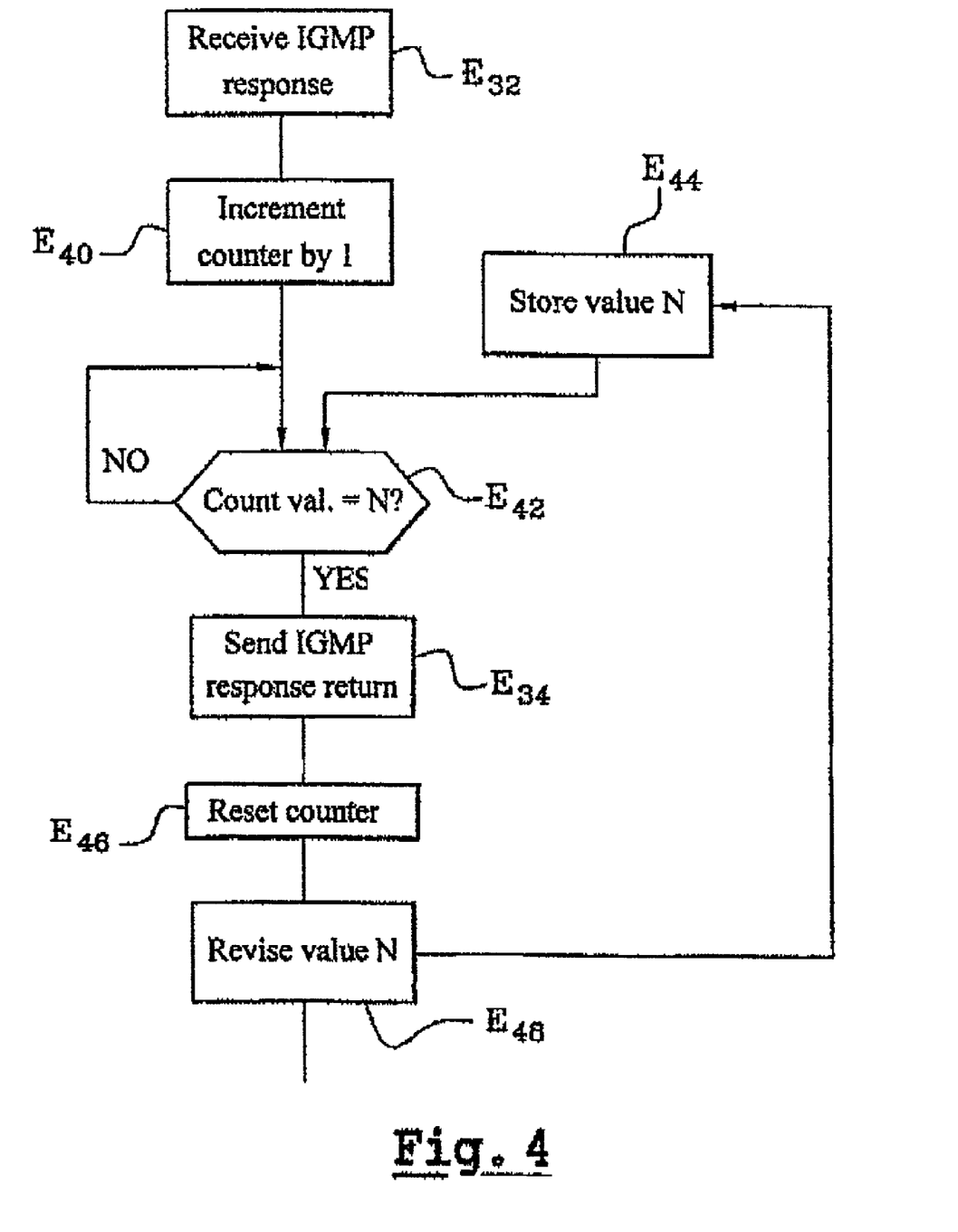
FIG. 4 is a flowchart of a first variant of the concept shown in FIG. 3.

The FIG. 4 flowchart explains the process steps executed at the gateway 10 end. On receiving each IGMP response (detected in step E32), beginning with the first one (that from the terminal TSi), a counter is incremented by one unit from an initial zero value (step E40) and a check is performed to verify if the value accumulated by the counter has reached the value N (step E42). In this example, the value N is stored in memory (step E44) so that it can be changed if necessary. As long as the number of responses received remains less than N, the process continues to await reception of the next response.

It is only when the number N is reached that the process advances to sending the IGMP response return (step E34). The counter is then reset to zero (step E46), and the cycle of counting received responses continues (step E40 and subsequent steps). In this way, only one in N of the IGMP responses received is returned to the terminals of the group.

In each cycle, the method can revise the value of N (step E48) in accordance with various criteria, for example in order to take account of changes to the group of participating terminals, the traffic, the required degree of reliability, etc. This revision can be based in particular on the total number of returns effected in step E34 following sending of the corresponding IGMP query (step E20, FIG. 3). For example, the value N can be adjusted so that the absolute number of returns remains substantially constant despite variations in the number of terminals participating in multicast data packet reception.

By adding at the gateway 10 end a function which returns one in every N messages received, in order to filter IGMP response returns on the return satellite link, the traffic load on the satellite go link can be reduced by a ratio close to 1/N. The ratio is not exactly equal to 1/N because returning the first IGMP response message is delayed by a time-delay equal to the average time to receive the first N messages.

For example, taking N=10 reduces by approximately 90% the traffic load on the satellite go link induced by the method of the invention in the embodiment described with reference to FIG. 3. That load then amounts to 10%×2%=0.2% of the initial load on the return channel.

Returning to the example given in the introduction of a gateway that manages 5000 multicast groups, each picked up by 2000 participating terminals, the 2000×5000=10,000,000 potential IGMP responses are reduced to 50,000 real IGMP responses on the return link and induce the gateway to send only approximately 5000 IGMP response returns on the go channel. The initially required return channel bandwidth of 75 Mbit/s can thus be reduced to 250 kbit/s and the method induces a load of only 25 kbit/s on the go channel.

Figure 5:
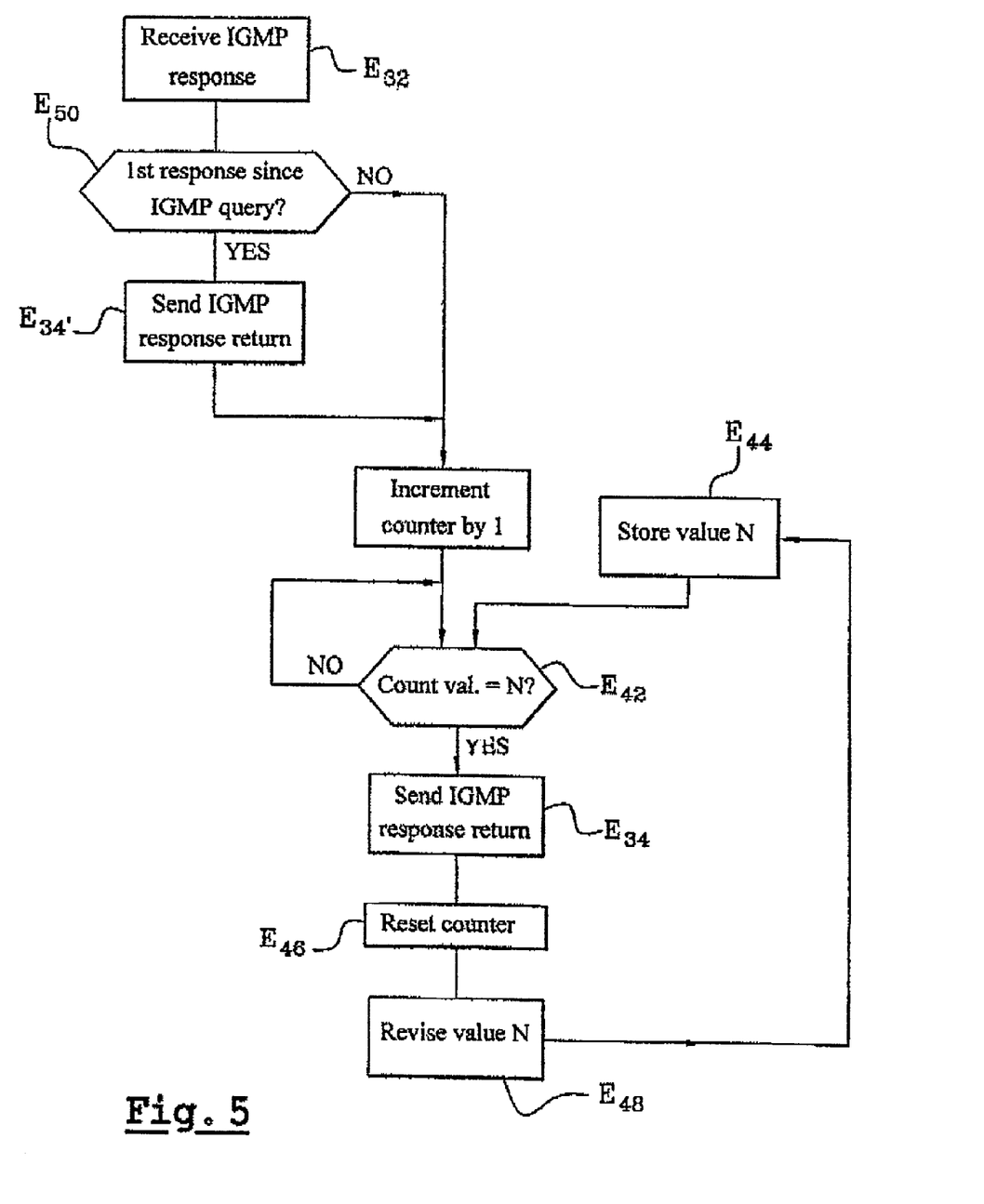

FIG. 5 is a flowchart of another variant, which differs from that of FIG. 4 in that the first IGMP response received at the gateway 10 end after sending the IGMP query that provoked it is systematically returned on starting counting. This enables a faster reaction by avoiding a first count up to N before a response return, obtained at the cost of an additional process step of detecting IGMP queries sent.

In the FIG. 5 process, after an IGMP response is received in step in E32, it is determined whether this is the first response since sending the query that provoked it (step E50). If so, the response is immediately returned to the terminals of the group (step E34') and the process then continues in the same manner as for the FIG. 4 variant, sending only one in N responses. Steps E34-E48 are identical to those of FIG. 4 and, for conciseness, are not repeated.

The IGMP response return mechanism according to the invention can be implemented either by a specific IGMP response return management unit between the router 6 and the gateway 10 or by integrating it into the IGMP stack of the router.

Figure 6:
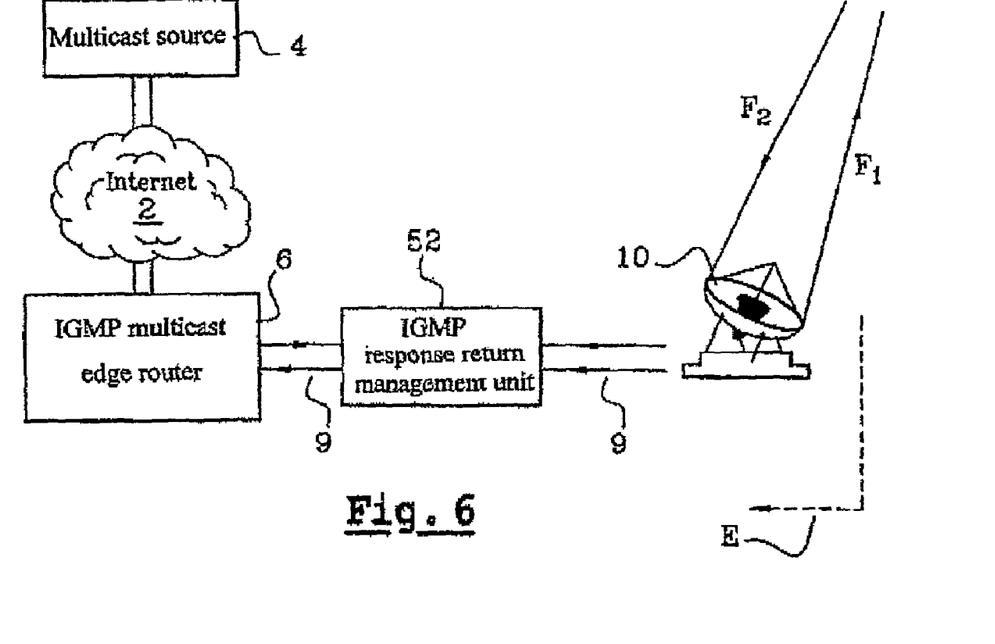

FIG. 6 shows the former option, with the IGMP response return management unit 52 installed on the bi-directional transmission link 9 or the like between the IGMP router 6 and the gateway 10. The unit 52 includes a microprocessor and communication interfaces for detecting and returning IGPM responses in accordance with the method shown in the FIGS. 3, 4 or 5 flowchart. The unit 52 can further statistically analyze returns to establish the value of N previously cited, in accordance with particular criteria, and manage the return of one in N received IGMP responses.

The unit 52 also transmits to the router 6 IGMP responses received from the terminals TS, so that the router can use the responses to manage multicasting in accordance with the IGMP. The invention provides various options for sending IGMP responses to the router:

each IGMP response received from the terminals is systematically transmitted to the router 6; in this way, in the FIG. 3 embodiment, the unit 52 sends each IGMP response received, on the one hand, to all the terminals TS1-TSn of the group concerned (step E34) and, on the other hand, to the router 6; or only a proportion of the IGMP responses received from the terminals are transmitted to the router 6; in the FIGS. 4 and 5 variants, this proportion can simply be equal to 1/N; the unit 52 can then additionally send to the router 6 each IGMP response return addressed to the terminals TS; the number of IGMP responses sent to the router 6 by the unit 52 can also represent a proportion 1/M different from 1/N, where M is a fixed or changing value.

Of course, these options are independent of the FIGS. 3 to 5 variants, and so the IGMP response return management unit 52 can transmit IGMP responses selectively to the router and systematically to the terminals, or vice versa, for example.

The unit 52 can route IGMP responses in a very simple manner, on the one hand by identifying the response, with reference to the corresponding field in the response message, and on the other hand by routing said response, if necessary, to the terminals TS (to perform the return step E34) and/or the router 6.

In the FIG. 5 variant, the unit 52 further identifies the IGMP query sent by the router 6 to establish the point of departure for identifying the first IGMP response received (cf. step E50), simply by referring to the corresponding field of the message.

The fact that the IGMP response return management unit 52 is separate from the router 6 enables the invention to be implemented with existing routers, such as those designed for a cable network conforming to the RFC 1112 standard.

Figure 7:
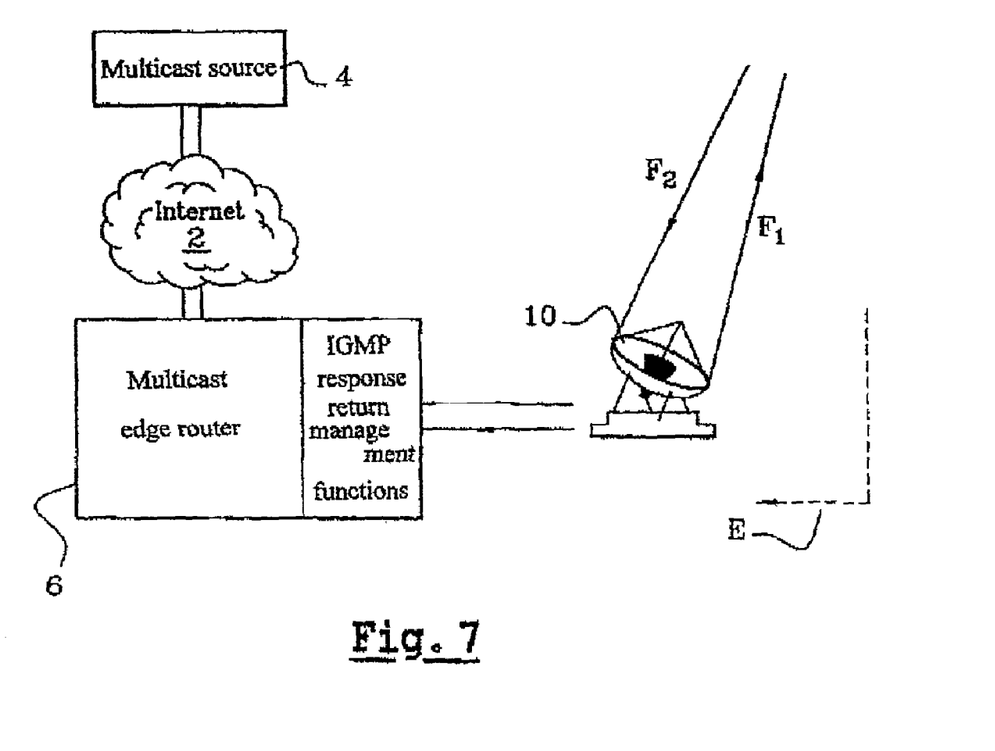

FIG. 7 shows the IGMP response return mechanism integrated into the IGMP stack of the router. The functions described are then implemented in a section 6' of the router 6 at the head of the link 9 to the gateway 10. This section 6' is managed in a centralized manner by the hardware and software of the router 6, but otherwise in exactly the same way as the unit 52 in FIG. 6.

Clearly many other variants of the invention that do not depart from the scope of the claims are feasible.

For example, instead of sending IGMP response returns from the gateway to the terminals, another message can be sent which has the same effect when received by the terminals, and which can be established by specific convention between the terminals TS and the router and/or the gateway 10, so that its reception by the terminals interrupts sending of the IGMP response.

Also, the invention is in no way limited to the membership query and membership report messages of the IGMP standard or to the RFC 1112 and RFC 2236 protocols, its field of application covering any other existing or future protocol and standard, to which the foregoing teachings apply in an equivalent or analogous manner.

What is claimed is:

1. A method of managing the multicast mode communication of data packets wherein the data packets are sent from a sending end of a physical transmission medium and received by terminals at a receiving end of said physical transmission medium, wherein mutual listening between the terminals is not supported, and wherein a query message is sent to the terminals in order to determine the presence of an active group of terminals as a function of the reception of a response message from a terminal of said active group of terminals, the method comprising:

sending a signal from said sending end to said terminals at said receiving end, wherein said signal indicates reception at the sending end of a response message from a terminal of said group of terminals; and terminals that did not send a response message, interrupting a process to send said response message on the basis of said signal indicating reception.

2. The method according to claim 1, wherein communication is managed according to an Internet Group Management Protocol (IGMP), said query message is an IGMP-member query message, and said response message is an IGMP membership report message.

3. The method according to claim 2, wherein the sending of a response message by a terminal of the active group of terminals is governed by the IGMP Request For Comments 1112 standard.

4. The method according to claim 1, wherein said signal sent from the sending end is a response message from a terminal of said active group of terminals.

5. The method according to claim 4, further comprising, when sending said signal, systematically returning to the terminals each response message received from a terminal of the active group of terminals.

6. The method according to claim 4, further comprising, when sending said signal, returning to the terminals a fewer number of received response messages than the total number of response messages received.

7. The method according to claim 6, wherein the number of received response messages returned is a fraction 1/N of the total number of response messages received, and wherein N is a fixed or changing number.

8. The method according to claim 7, further comprising, dynamically changing the value N based on conditions of use of the network in order to maintain substantially constant the number of received response messages returned in the sending step for each query message sent.

9. The method according to claim 2, wherein said signal is sent via a gateway of a radio link that is used to broadcast said multicast data packets to the terminals and wherein said gateway is responsible for IGMP multicast transmission mechanisms.

10. The method according to claim 9, wherein transmission occurs over a radio satellite link, said terminals are satellite terminals, the multicast data packets and said signal are sent on a go link on a first carrier frequency, and the response message or each response message is sent by the group of satellite terminals on a return link on a second carrier frequency different from the first carrier frequency.

11. The method according to claim 9, wherein sending said signal is operated by a management unit located at the gateway or between the gateway and a router that sends said data packets in multicast mode to the terminals.

12. The method according to claim 11, wherein the management unit operates transparently with respect to the router and sends the router a response message received from the active group of terminals.

13. The method according to claim 9, wherein management means is functionally integrated into a router which sends the multicast data packets to the terminals.

14. A system for managing the multicast mode communication of data packets, wherein the data packets are sent from a sending end of a physical transmission medium and received by terminals at a receiving end of said physical transmission medium, wherein mutual listening between the terminals is not supported, and wherein a query message is sent to the terminals in order to determine the presence of an active group of terminals as a function of the reception of a response message from a terminal of said active group of terminals, the system comprising:
means for sending a signal from said sending end to said terminals at said receiving end, wherein said signal indicates reception at the sending end of a response message from a terminal of said group of terminals; and
means for terminals that have not sent a response message to interrupt a process to send a response message on the basis of receipt of said signal indicating reception.

15. The system according to claim 14, wherein communication is managed according to Internet Group Management Protocol (IGMP), said query message is an IGMP membership query message, and said response message is an IGMP membership report message.

16. The system according to claim 15, wherein the sending of a response message by a terminal of the active group of terminals, is governed by the IGMP Request For Comments 1112.

17. The system according to claim 14, wherein said signal sent from the sending end is a response message returned to the terminals from a terminal of said active group of terminals.

18. The system according to claim 17, wherein said sending end is configured to systematically return to the terminals each response message received from a terminal of the active group of terminals.

19. The system according to claim 17, wherein said sending end is configured to return to the terminals a fewer number of received response messages than the total number of response messages received.

20. The system according to claim 19, wherein the number of received response messages returned is a fraction 1/N of the total number of response messages received, where N is a fixed or changing number.

21. The system according to claim 20, wherein said sending end is configured to dynamically change the value N based on conditions of use of the network in order to maintain substantially constant the number of received response messages returned for each query message sent.

22. The system according to claim 14, wherein said signal is sent via a gateway of a radio link that is used to broadcast said data packets in multicast mode to the terminals wherein said gateway is responsible for IGMP multicast transmission mechanisms.

23. The system according to claim 22, wherein transmission occurs over a radio satellite link, said terminals are satellite terminals, the multicast data packets and said signal are sent on a go link on a first carrier frequency, and the response message or each response message is sent by the group of satellite terminals on a return link on a second carrier frequency different from the first carrier frequency.

24. The system according to claim 22, wherein a management means is located at the gateway or between the gateway and a router that sends said data packets in multicast mode to the terminals.

25. The system according to claim 24, wherein said management means operates transparently with respect to the router and sends the router a response message received from the group of terminals.

26. The system according to claim 22, wherein said management means is functionally integrated into a router which sends the multicast data to the terminals.

27. A router configured to manage the multicast mode communication of data packets wherein the data packets are sent from a sending end of a physical transmission medium and received by terminals at a receiving end of said physical transmission medium, wherein mutual listening between the terminals is not supported, and wherein a query message is sent to the terminals in order to determine the presence of an active group of terminals as a function of the reception of a response message from a terminal of said active group of terminals, the router comprising:
means for sending a signal from said sending end to said terminals at said receiving end, wherein said signal indicates reception at the sending end of a response message from a terminal of said group of terminals; and means for terminals that have not sent a response message, on the basis of receipt of said signal indicating reception, to interrupt a process to send a response message.

28. A method of managing the multicasting of data packets from a sending end of a physical transmission medium to terminals at a receiving end of the physical transmission medium, wherein the physical transmission medium does not support mutual listening between the terminals, the method comprising:
   sending a query message to an active group of terminals;
   sending a response message by a terminal of said active group of terminals;
   receiving said response message;
   determining the presence of an active group of terminals based on the response message;
   sending the active group of terminals a signal indicating reception of the response message; and
   interrupting a process in the terminals for sending the response message, based on receipt of the signal.

29. A system for managing the multicasting of data packets, the system comprising:
   a transmission system that does not support mutual listening between terminals, comprising:
      a sending end;
      a receiving end;
      a plurality of active terminals located at the receiving end;
   wherein:
      the sending end sends a query message to the active terminals;
      a terminal sends a response message;
      the sending end receives the response message
      the sending end sends a signal indicating receipt of the response message to the active terminals; and
      upon receipt of the signal, a terminal which has not sent a response message interrupts a process for sending a response message.

* * * * *